(12) United States Patent
Cogswell et al.

(10) Patent No.: US 12,097,394 B2
(45) Date of Patent: Sep. 24, 2024

(54) SMART MATERIAL MECHANISM FOR FIRE SPRINKLERS

(71) Applicant: Johnson Controls Technology Company, Auburn Hills, MI (US)

(72) Inventors: Jeremy T. Cogswell, Johnston, RI (US); Manuel R. Silva, Jr., Cranston, RI (US); Timothy C. Gamroth, Dousman, WI (US); Kirk P. Henderson, Oconomowoc, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 648 days.

(21) Appl. No.: 16/980,992

(22) PCT Filed: Mar. 21, 2019

(86) PCT No.: PCT/US2019/023451
§ 371 (c)(1),
(2) Date: Sep. 15, 2020

(87) PCT Pub. No.: WO2019/183408
PCT Pub. Date: Sep. 26, 2019

(65) Prior Publication Data
US 2020/0406079 A1 Dec. 31, 2020

Related U.S. Application Data
(60) Provisional application No. 62/646,866, filed on Mar. 22, 2018.

(51) Int. Cl.
*A62C 37/11* (2006.01)
*A62C 2/24* (2006.01)
(Continued)

(52) U.S. Cl.
CPC ............. *A62C 37/11* (2013.01); *A62C 2/24* (2013.01); *A62C 2/245* (2013.01); *A62C 37/46* (2013.01); *F03G 7/065* (2013.01)

(58) Field of Classification Search
CPC ......... A62C 37/11; A62C 37/12; A62C 37/16; A62C 37/46; F03G 7/065
See application file for complete search history.

(56) References Cited

U.S. PATENT DOCUMENTS 4,167,974 A * 9/1979 Job .................. A62C 37/14
169/38
4,596,483 A * 6/1986 Gabriel ............ G05D 23/024
411/DIG. 2

(Continued)

FOREIGN PATENT DOCUMENTS

CN 202526820 11/2012
CN 107737428 A 2/2018
(Continued)

OTHER PUBLICATIONS

English Translation of CN 108355281 A to Huang (Year: 2018).*
International Search Report and Written Opinion on PCT/US2019/023451, mail date Jul. 5, 2019, 16 pages.

*Primary Examiner* — Darren W Gorman
(74) *Attorney, Agent, or Firm* — Foley & Lardner LLP

(57) ABSTRACT

A sprinkler for a fire suppression system includes a body defining an inlet and an outlet fluidly coupled to one another, a frame assembly including a frame member coupled to the body and extending away from the outlet, a deflector coupled to the frame member and offset from the outlet, a seal assembly configured to sealingly engage the body to prevent flow through the outlet, and a trigger assembly. The trigger assembly includes a shape memory alloy element configured to deform from an unactuated configuration to an actuated configuration in response to reaching an activation (Continued)

temperature. In the unactuated configuration, the trigger assembly directly engages both the frame assembly and the seal assembly and holds the seal assembly in sealed engagement with the body. In the actuated configuration, the trigger assembly permits the seal assembly to disengage from the body.

9 Claims, 11 Drawing Sheets

(51) Int. Cl.
*A62C 37/46* (2006.01)
*F03G 7/06* (2006.01)

(56) References Cited

U.S. PATENT DOCUMENTS

| | | | | |
|---|---|---|---|---|
| 4,706,758 | A * | 11/1987 | Johnson | A62C 37/08 169/90 |
| 4,896,728 | A * | 1/1990 | Wolff | F03G 7/065 169/37 |
| 5,494,113 | A | 2/1996 | Polan | |
| 5,622,225 | A * | 4/1997 | Sundholm | A62C 37/14 169/61 |
| 6,073,700 | A * | 6/2000 | Tsuji | A62C 37/16 169/90 |
| 8,684,101 | B2 | 4/2014 | Johnson et al. | |
| 10,124,197 | B2 | 11/2018 | Johnson | |
| 2007/0246233 | A1 * | 10/2007 | Johnson | A62C 35/68 169/42 |
| 2009/0242218 | A1 * | 10/2009 | Van Schoor | A62C 37/11 169/56 |
| 2010/0006304 | A1 | 1/2010 | Johnson et al. | |
| 2014/0060858 | A1 | 3/2014 | Johnson | |
| 2018/0200552 | A1 * | 7/2018 | Wertsberger | A62C 37/40 |
| 2018/0289998 | A1 * | 10/2018 | Hyslop | A62C 37/11 |

FOREIGN PATENT DOCUMENTS

| | | | | |
|---|---|---|---|---|
| CN | 108355281 A | * | 8/2018 | A62C 31/02 |
| RU | 18931 | | 8/2001 | |
| WO | WO-2009/114186 | | 9/2009 | |

* cited by examiner

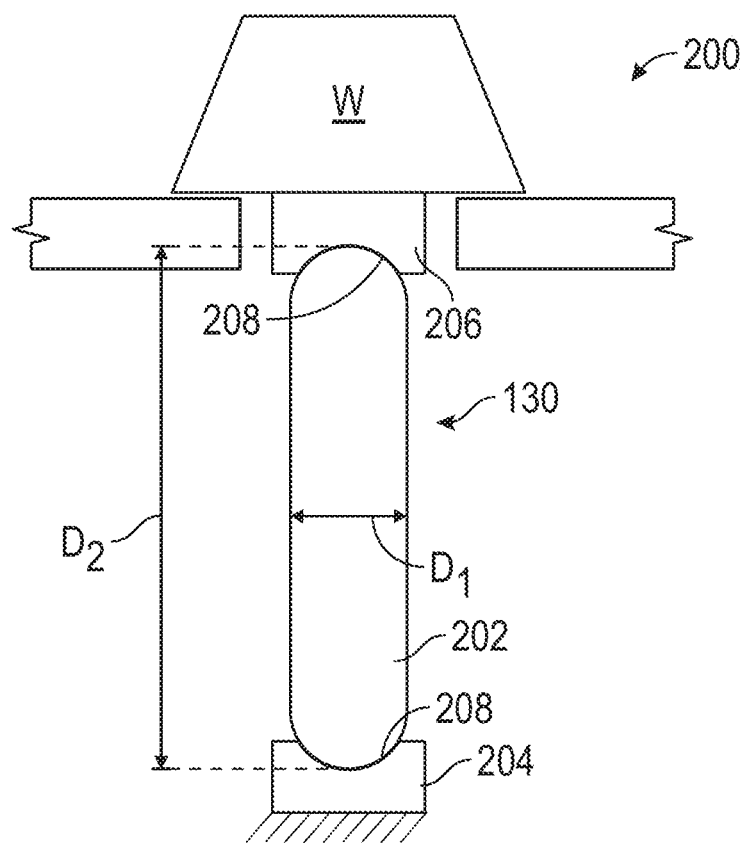
FIG. 4
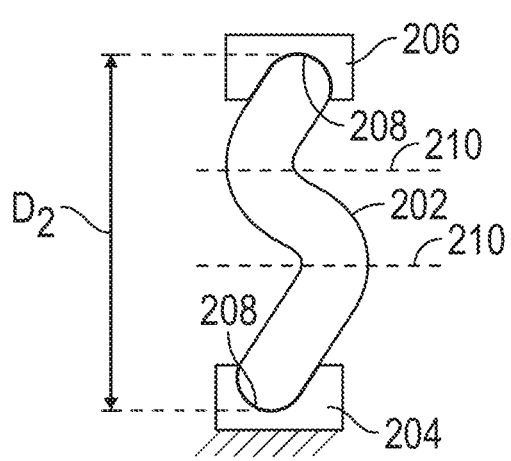 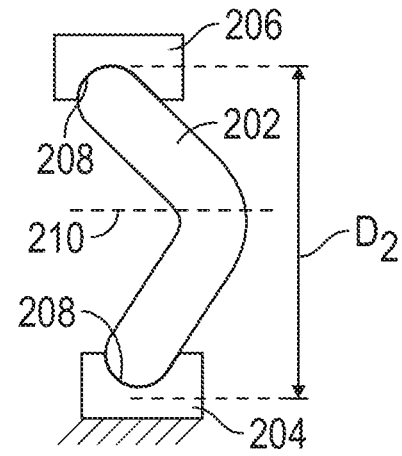
FIG. 5A  FIG. 5B

SMART MATERIAL MECHANISM FOR FIRE SPRINKLERS

CROSS-REFERENCE TO RELATED PATENT APPLICATION

This application claims the benefit of U.S. Provisional Patent Application No. 62/646,866, filed Mar. 22, 2018, which is incorporated herein by reference in its entirety.

BACKGROUND

Fire protection sprinkler systems are some of the most widely used devices for fire protection. These systems have sprinklers that are activated once the ambient temperature in an environment, such as a room or building, exceeds a predetermined value. Once activated, the sprinklers distribute fire suppressant fluid, such as water, in the room or building. A sprinkler system is considered effective if it extinguishes or prevents growth of a fire.

Fire protection sprinklers generally include a body with an outlet, an inlet connectable to a source of pressurized fire suppressant fluid under pressure, and a deflector supported by the body in a position opposing the outlet for distribution of the fire retardant fluid over a predetermined area to be protected from fire. Individual fire protection sprinklers may be closed or sealed by a cap. The cap is held in place by a thermally-sensitive element which is released when its temperature is elevated to within a prescribed range, e.g. by the heat from a fire.

SUMMARY

At least one embodiment relates to a sprinkler for a fire suppression system. The sprinkler includes a body defining an inlet and an outlet fluidly coupled to one another, a frame assembly including a frame member coupled to the body and extending away from the outlet, a deflector coupled to the frame member and offset from the outlet, a seal assembly configured to sealingly engage the body to prevent flow through the outlet, and a trigger assembly. The trigger assembly includes a shape memory alloy element configured to deform from an unactuated configuration to an actuated configuration in response to reaching an activation temperature. In the unactuated configuration, the trigger assembly directly engages both the frame assembly and the seal assembly and holds the seal assembly in sealed engagement with the body. In the actuated configuration, the trigger assembly permits the seal assembly to disengage from the body.

In some embodiments, the trigger assembly includes only one shape memory alloy element.

In some embodiments, the trigger assembly includes a series of shape memory alloy elements.

In some embodiments, the trigger assembly includes a collar extending at least partially around the shape memory alloy elements and coupling the shape memory alloy elements to one another in the unactuated configuration.

In some embodiments, the collar is configured to deform when transitioning from the unactuated configuration to the actuated configuration, permitting the shape memory alloy elements to separate from one another.

In some embodiments, the shape memory alloy elements are directly coupled to one another.

In some embodiments, the shape memory alloy elements are directly fixedly coupled to one another at a series of points distributed along the length of each shape memory alloy element.

In some embodiments, the trigger assembly includes a push rod that is received by an outer tube, and the shape memory alloy element moves the push rod relative to the outer tube when transitioning from the unactuated state to the actuated state to reduce an overall length of the trigger assembly.

In some embodiments, the shape memory alloy element is a shape memory alloy lever fixedly coupled to the outer tube and supporting the push rod.

In some embodiments, the shape memory alloy elements extend radially inward from the outer tube.

In some embodiments, the shape memory alloy levers are integrally formed with the outer tube.

In some embodiments, the shape memory alloy element is a tubular element having a wall that defines a passage.

In some embodiments, one or more slots extend through the wall.

In some embodiments, a slot extends through the wall along the entire length of the tubular element.

In some embodiments, tubular element unrolls when transitioning from the unactuated state to the actuated state.

Another embodiment relates to a trigger assembly for a sprinkler. The trigger assembly includes a shape memory alloy element configured to deform from an unactuated configuration to an actuated configuration in response to reaching an activation temperature. The trigger assembly has a first end configured to engage a frame assembly of the sprinkler and a second end opposite the first end that is configured to directly engage a seal assembly of the sprinkler. The trigger assembly has a first distance between the first end and the second end in the unactuated configuration and a second distance between the first end and the second end in the actuated configuration. The first distance is greater than the second distance.

Another embodiment relates to a method of manufacturing a sprinkler. The method includes providing a body defining an inlet and an outlet in fluid communication with one another, the body having a central axis, fixedly coupling a frame member to the body, translatably coupling an adjustment mechanism to the frame member, positioning a seal assembly such that the seal assembly extends across the outlet, inserting a trigger assembly between the adjustment mechanism and the seal assembly, and translating the adjustment mechanism toward the body until a compressive force is applied to the trigger assembly along the central axis by the seal assembly and the adjustment mechanism. The trigger assembly includes a shape memory alloy element configured to deform from an unactuated configuration to an actuated configuration in response to reaching an activation temperature. The compressive force decreases when the trigger assembly transitions from the unactuated configuration to the actuated configuration.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

FIG. 4 is a schematic view of a model illustrating a loading of a shape memory alloy (SMA) element of an SMA trigger of a sprinkler assembly in an unactuated configuration, according to an exemplary embodiment.

FIG. 5A is a side view of an SMA element in an actuated configuration, according to an exemplary embodiment.

FIG. 5B is a side view of an SMA element in an actuated configuration, according to another exemplary embodiment.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Some fire sprinkler systems utilize a trigger device, such as a glass bulb or a solder element. Embodiments of the present disclosure utilize Shape Memory Alloy (SMA) to replace the trigger device of a fire sprinkler. The SMA trigger is responsive to a temperature indicative of fire, causing the SMA trigger to deform (change size and/or shape) when exposed to the temperature. In some embodiments, the SMA trigger deforms by varying its length. In some embodiments, the SMA trigger deforms to a C-shape. Upon deforming, the SMA trigger releases a seal assembly, allowing water to discharge through the fire sprinkler.

Fire Suppression System

Fire suppression sprinklers generally include a body with an outlet, an inlet connectable to a source of fire retardant fluid or fire suppressant fluid under pressure, and a deflector supported by the body in a position opposing the outlet for distribution of the fire-extinguishing fluid over a predetermined area to be protected from fire. Individual fire suppression sprinklers may be closed or sealed by a cap. The cap is held in place by a thermally-sensitive element which is released when its temperature is elevated to within a prescribed range (e.g. by the heat from a fire).

Figure 1A:
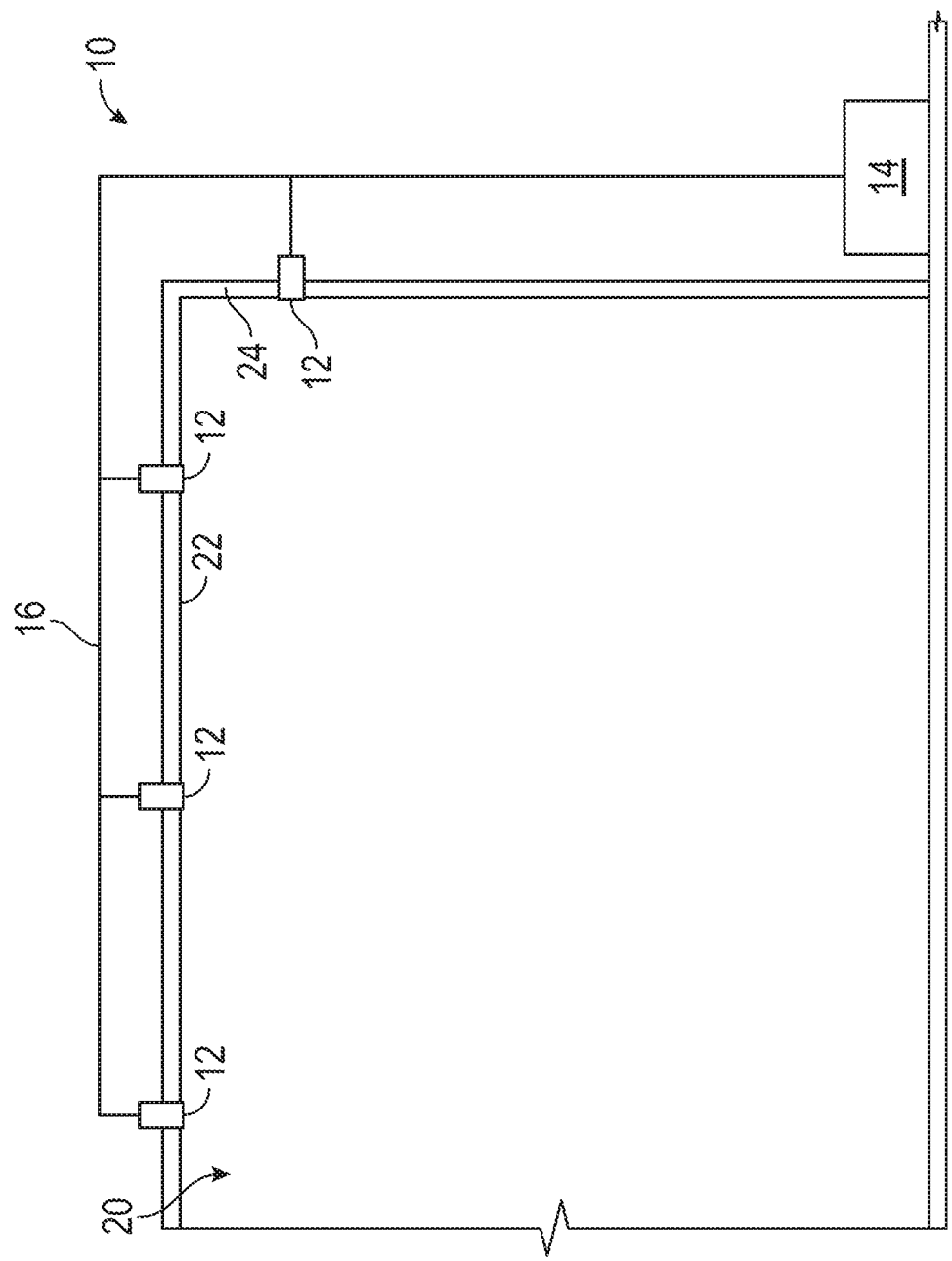
FIG. 1A is a schematic view of a fire suppression system of a building, according to an exemplary embodiment.

Referring to FIG. 1A, a fire suppression system 10 for a building or other space is shown according to an exemplary embodiment. The fire suppression system 10 includes a series of sprinklers 12 fluidly coupled to a source 14 of fire suppressant fluid, such as water. The source 14 can include a pump that pressurizes the fire suppressant fluid, a reservoir filled with fire suppressant fluid and positioned atop the building, or another source of pressurized fire suppressant fluid. The sprinklers 12 are fluidly coupled to the source 14 through one or more conduits 16 (e.g., pipes, hoses, etc.). A room 20 of the building can utilize one or more sprinklers 12. In some embodiments, the sprinklers 12 and/or the conduits 16 extend above a ceiling 22 of the room 20 such that the sprinklers 12 and/or the conduits 16 are obscured from view. Additionally or alternatively, the sprinklers 12 may extend into a wall 24 such that the sprinklers 12 and/or conduits 16 are obscured from view. In other embodiments, the sprinklers 12 and/or the conduits 16 are not obscured from view. In the event that a fire occurs within the room 20, the ambient temperature around the sprinklers 12 increases. Once the temperature increases above a threshold temperature, the sprinklers 12 activate, spreading the fire suppressant fluid throughout the room 20 to contain and/or extinguish the fire.

Sprinkler Assembly

Figure 1B:
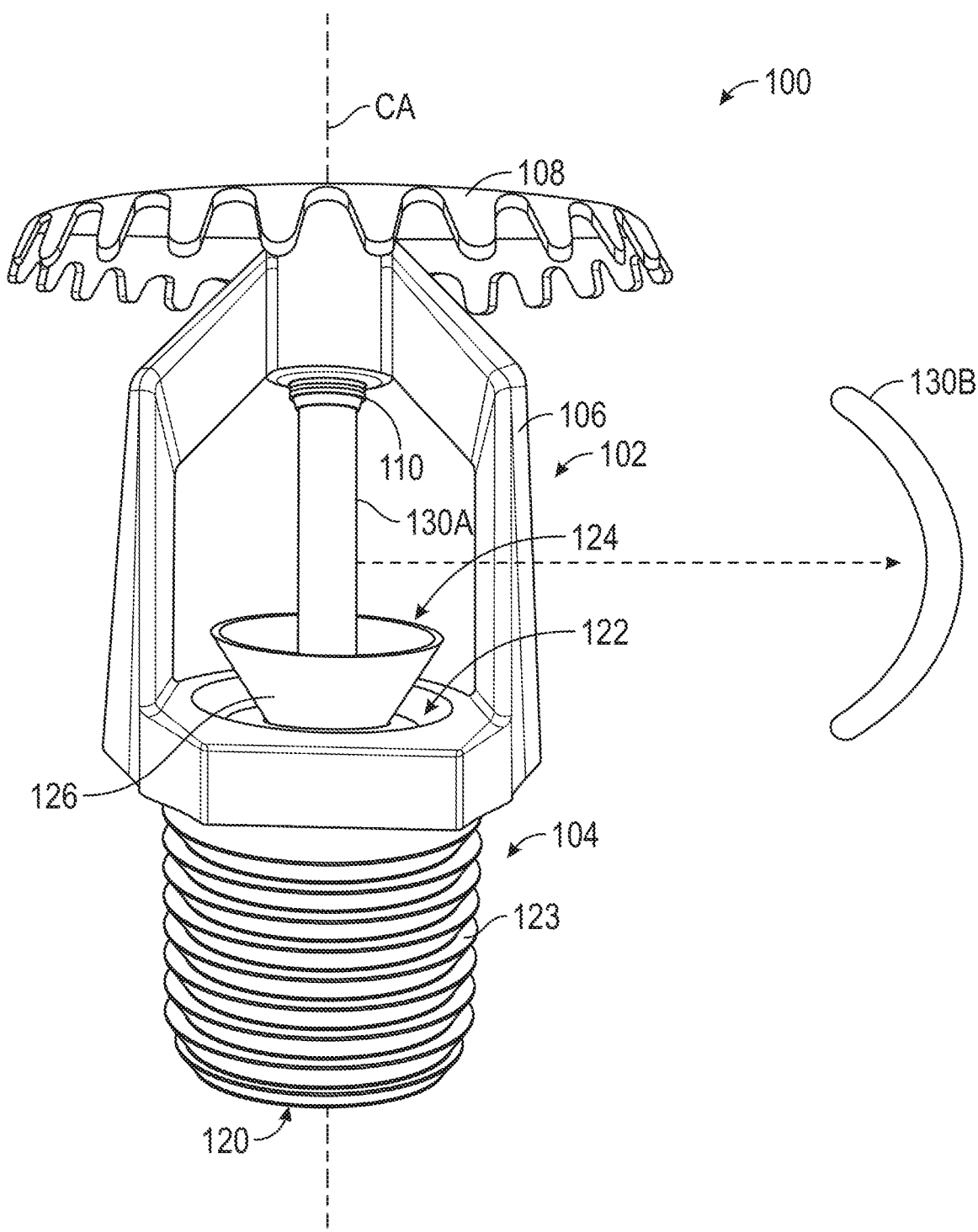
FIG. 1B is a perspective view of a sprinkler assembly, according to some exemplary embodiment.

Referring to FIG. 1B, a fire sprinkler assembly, shown as sprinkler 100, is shown according to an exemplary embodiment. The sprinkler 100 is intended to be illustrative of one non-limiting example embodiment. The sprinkler 100 is shown to include a sprinkler frame, shown as frame assembly 102, coupled to a main body, shown as body 104, both of which are substantially centered about a central axis CA of the sprinkler 100. The frame assembly 102 includes a support structure, shown as frame 106, fixedly coupled (e.g., integrally formed with) the body 104. As shown, the frame 106 is generally arc-shaped and oriented such that the center of the arc extends away from the body 104. The frame assembly 102 may include any number of arms or structural features. The frame assembly 102 further includes a fluid deflecting structure, shown as deflector 108, fixedly coupled to the frame 106. The deflector 108 is offset from the body 104 and substantially centered about the central axis CA.

The frame assembly 102 further includes an adjustment device (e.g., a screw, a slider, etc.) shown as setscrew 110, that is substantially centered about the central axis CA. The frame 106 and the deflector 108 define an aperture configured to receive the setscrew 110. The aperture is threaded such that the setscrew 110 translates along the central axis CA when rotated. During assembly and maintenance of the sprinkler 100, the setscrew 110 may be rotated to adjust a position of the setscrew 110 along the central axis CA, moving the setscrew 110 closer to or farther from the body 104.

The body 104 defines an internal passageway (e.g., a passage) extending from an inlet 120 to an outlet 122. In some embodiments, the inlet 120 and the outlet 122 are substantially centered about the central axis CA. The inlet 120 is fluidly coupled to a source of fire suppressant fluid (e.g., the conduit 16) and facilitates flowing fluid through the body 104. As shown in FIG. 1B, the body 104 includes a threaded portion 123 that facilitates coupling the sprinkler 100 to the conduit 16. In an unactuated configuration of the sprinkler 100, a seal assembly 124 extends across the outlet 122, sealing the passageway and preventing the flow of fluid out of the sprinkler 100. The seal assembly 124 includes a sealing body (e.g., a plug, an adapter, etc.), shown as button 126. An annular sealing member or element (e.g., a frusto-conical spring, a Belleville washer, etc.), shown in FIG. 10 as seal 128, is positioned between the button 126 and the body 104 and compressed to form a seal.

A trigger assembly (e.g., a prop, a rod, a spacer, a tube, a column, etc.), shown as shape memory alloy (SMA) trigger 130A, is shown in an unactuated configuration or state (e.g., a nominal state, a predeformation state, a holding state, a sealing state, etc.). The SMA trigger 130A extends directly between and directly engages the setscrew 110 and the button 126. The setscrew 110 and the button 126 engage opposing ends of the SMA trigger 130A. As shown, the SMA trigger 130 is substantially centered about and axially aligned with the central axis CA. During installation of the SMA trigger 130 into the sprinkler 100, the setscrew 110 is tightened, imparting a compressive loading onto the SMA trigger 130 substantially aligned with the central axis CA. The SMA trigger 130 in turn imparts a corresponding loading on the button 126, compressing the seal 128 between the button 126 and the body 104. In some embodiments, the compressive force supported by the SMA trigger 130 is approximately 150 pounds.

In an unactuated configuration, the SMA trigger 130A provides a sufficient opposing force to act against the seal assembly 124 preventing fluid or liquid from exiting the outlet 122. If the opposing force to the seal assembly 124 is removed (e.g., if the SMA trigger 130A deforms), the sprinkler 100 enters an actuated configuration or state (e.g., an activated state, a flowing state, an open state, a suppressing state, etc.), and fluid from the outlet 122 flows toward the deflector 112. The deflector 112 spreads the spray of the fluid out laterally, and the fluid suppresses fires in the room 20. In the actuated configuration, the SMA trigger 130A may deform (e.g., shrink and/or bend) to change size and/or shape, for example to the shape of the SMA trigger 130B. In some embodiments, the SMA trigger 130A bends (e.g., to a C-shape, to an S-shape). In this regard, deforming to a C-shape may improve reliability, for example of removing the opposing force of the SMA trigger 130 to the seal assembly 124 and/or to permit the seal assembly 124 to disengage from the sprinkler 100. In other embodiments, the SMA trigger 130A shrinks to a shorter overall length (e.g., as measured between the point of contact between the SMA trigger 130A and the setscrew 110 and the point of contact between the SMA trigger 130 and the button 126). In yet other embodiments, the SMA trigger 130A both bends and shrinks to a shorter overall length.

Figure 2:
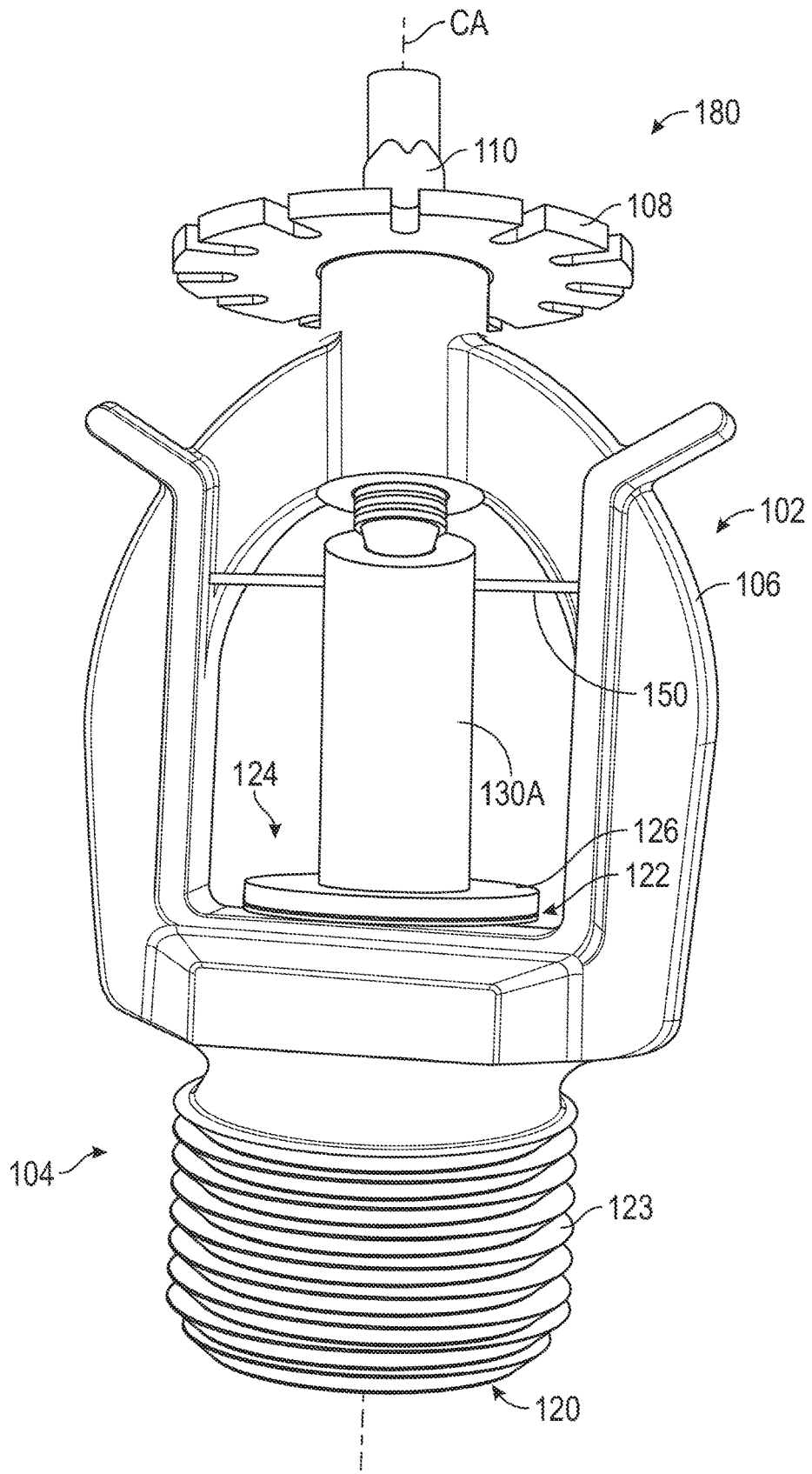
FIG. 2 is a perspective view of a sprinkler assembly, according to another exemplary embodiment.
Figure 3:
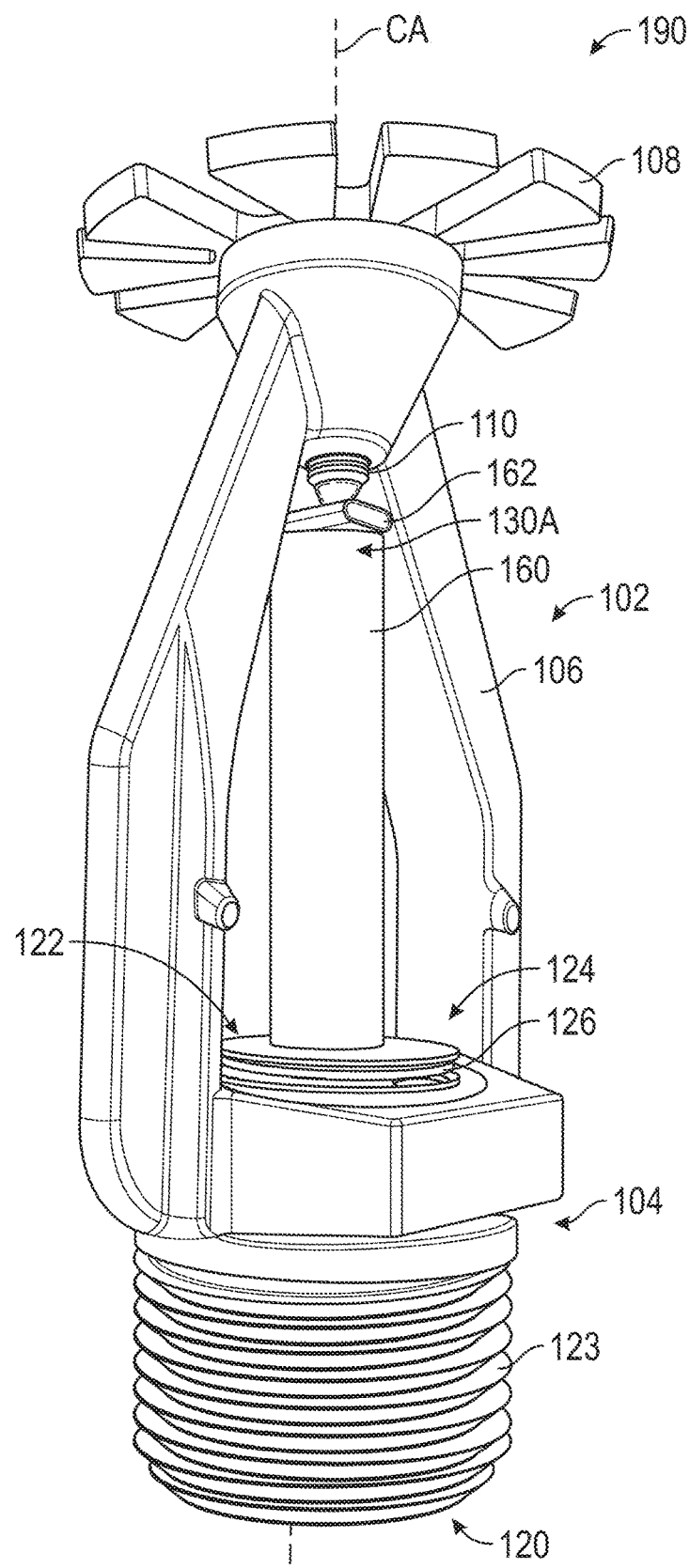
FIG. 3 is a perspective view of a sprinkler assembly, according to another exemplary embodiment.

FIGS. 2 and 3 illustrate a sprinkler 180 and a sprinkler 190, respectively, that utilize the SMA trigger 130. The sprinkler 180 and the sprinkler 190 may be substantially similar to the sprinkler 100 except as otherwise stated herein. The sprinkler 180 includes a biasing element, shown as ejection spring 150. The ejection spring 150 extends around a rear side of the SMA trigger 130 and along a front side of the frame assembly 102. The ejection spring 150 is configured to impart a lateral (e.g., perpendicular to the central axis CA) force on the SMA trigger 130. In the unactuated configuration, the compressive force on the SMA trigger 130 is enough to overcome this lateral force and hold the SMA trigger 130 in place. When the SMA trigger 130 begins to deform, the compressive force on the SMA trigger 130 lessens, and the ejection spring 150 forces the SMA trigger 130 away from the setscrew 110 and/or the button 126. This prevents fluid pressure on the button 126 from holding the SMA trigger 130 in place and facilitates complete activation of the sprinkler 100. The ejection spring 150 may be used in any of the sprinklers described herein. In some embodiments, off-axis trigger assemblies are utilized. As shown in FIG. 3, the sprinkler 190 includes an off-axis trigger assembly including a strut 160 that is not parallel with the central axis CA and a lever 162 that extends between the strut 160 and the setscrew 110.

Shape Memory Alloy Trigger Assembly

Embodiments of the present disclosure include an SMA trigger configured to activate a fire sprinkler assembly upon reaching a threshold or activation temperature. As used herein, the terminology "shape memory alloy" (often abbreviated as "SMA") refers to alloys which exhibit a shape memory effect. An SMA may undergo a solid state, crystallographic phase change to shift between a martensite phase, i.e., "martensite," and an austenite phase, i.e., "austenite." Alternatively stated, an SMA may undergo a displacive transformation rather than a diffusional transformation to shift between martensite and austenite. A displacive transformation is a structural change that occurs by the coordinated movement of atoms (or groups of atoms) relative to their neighbors.

The SMA trigger 130 may be of any suitable SMA composition. In an example embodiment, the SMA trigger 130 uses a combination of nickel and titanium with a small additive of aluminum. The SMA trigger 130 may include an element selected from the group including, without limitation: cobalt, nickel, titanium, indium, manganese, iron, palladium, zinc, copper, silver, gold, cadmium, tin, silicon, platinum, gallium, and combinations thereof. For example, and without limitation, suitable shape memory alloys may include nickel-titanium based alloys, nickel-aluminum based alloys, nickel-gallium based alloys, indium-titanium based alloys, indium-cadmium based alloys, nickel-cobalt-aluminum based alloys, nickel-manganese-gallium based alloys, copper based alloys (e.g., copper-zinc alloys, copper-aluminum alloys, copper-gold alloys, and copper-tin alloys), gold-cadmium based alloys, silver-cadmium based alloys, manganese-copper based alloys, iron-platinum based alloys, iron-palladium based alloys, and combinations thereof. The SMA trigger 130 may have components with binary, ternary, or any higher order so long as the shape memory alloy material exhibits a shape memory effect (i.e., a change in shape orientation, damping capacity, etc.).

In some embodiments, when an SMA trigger of a fire sprinkler is exposed to a temperature indicative of a fire, the SMA trigger may begin to deform from an unactuated shape to an actuated shape. In the unactuated shape, the SMA trigger provides a sufficient opposing force to act against a seal assembly preventing fluid or liquid from exiting an outlet of the fire sprinkler. The actuated shape may correspond to a C-shape and/or a smaller size relative to the unactuated shape. In some embodiments, when the SMA trigger deforms to the actuated shape, a screw disengages from the SMA trigger. The SMA trigger disengages from the seal assembly, thereby removing the opposing force acting against the seal assembly. The fluid or liquid is permitted to flow through the body of the fire sprinkler and discharge from the outlet to a deflecting structure. The SMA trigger 130 shown in FIG. 1B is intended to be a generic example of an SMA trigger. Accordingly, the SMA trigger 130 shown in FIG. 1 may represent any of the embodiments described herein.

The SMA trigger 130 may include one or more SMA components and one or more non-SMA components (e.g., components that deform minimally in response to a variation in temperature). Referring to FIG. 4, a model 200 illustrates an exemplary loading of an SMA element 202 of the SMA trigger 130. The SMA element 202 includes (e.g., is made entirely from) SMA material. This loading arrangement may represent the loading that the SMA element 202 experiences within the sprinkler 100 or any of the other sprinklers shown herein. In FIG. 4, the SMA trigger 130 (and thus the SMA element 202) is arranged in the unactuated configuration. In the unactuated configuration, the SMA element 202 is arranged substantially vertically. A first end of the SMA element 202 engages a first fixturing element, block, or receiver (e.g., representing the setscrew 110), shown as fixed block 204, that is fixed in space. A second end of the SMA element 202 engages a second fixturing element, block, or receiver (e.g., representing the seal assembly 124), shown as translating block 206, that is permitted to translate freely vertically. As shown, the ends of the SMA element 202 are rounded (e.g., semispherical, domed, etc.), and the fixed block 204 and the translating block 206 each define correspondingly-shaped recesses 208 that receive the ends. This arrangement permits rotation of the SMA element 202 relative to the fixed block 204 and the translating block 206.

A load, shown as weight W, is applied downward on the SMA element 202 through the translating block 206. The weight W may represent the force that the SMA trigger 130 experiences in the unactuated configuration (e.g., the combination of the force required to compress the seal assembly 124 and the force required to resist the pressurized fluid acting on the seal assembly 124). In some embodiments, the weight W is approximately 150 pounds.

In the unactuated configuration, the SMA element 202 may be configured to support the weight W over an extended period of time (e.g., 50 years) without deforming. As shown, the SMA element 202 is a rod having a diameter $D_1$ and an overall length $D_2$ measured as the vertical distance between the top and bottommost points of the SMA element 202. In an embodiment that includes only a single, solid SMA element 202 (e.g., the SMA element 302), the diameter $D_1$ may be approximately 2-3 mm and the overall length $D_2$ may be approximately 25.4 mm.

In response to reaching or exceeding a transition temperature, operating temperature, activation temperature, or threshold temperature, the SMA element 202 is configured to deform to the actuated configuration. The SMA element 202 may reach the transition temperature in response to an ambient temperature of the surrounding fluid (e.g., air) reaching or exceeding the operating temperature. At temperatures below the operating temperature, the SMA element 202 may experience very little or no deflection. The SMA element 202 may deform to the actuated configuration quickly upon reaching the operating temperature. By way of example, the SMA element may have less than a 15 second transition time when moved from a room temperature environment to an environment at the operating temperature. After changing to the actuated configuration, the SMA element 202 may or may not be capable of transitioning back to the unactuated configuration. Instead, the SMA element 202 may be discarded and/or replaced after the sprinkler 100 is activated.

Referring to FIGS. 5A and 5B, the SMA element 202 is shown in the actuated configuration. In these embodiments, the SMA element 202 is trained (e.g., manufactured, configured, etc.) to decrease the overall length $D_2$ by bending in response to reaching the operating temperature. This is facilitated by the corresponding rounded shapes of the ends of the SMA element 202, and the recesses of the fixed block 204 and the translating block 206. As shown in FIG. 5A, the SMA element 202 is configured to bend about two bend axes 210. As shown in FIG. 5B, the SMA element 202 is configured to bend about a single bend axis 210. In other embodiments, the SMA element 202 is configured to bend about more than two bend axes. Another bending deformation is shown in FIG. 1B. In this embodiment, the SMA trigger 130 forms a C shape. In some embodiments, SMA formulations such as Nitinol are used to achieve a bending deformation.

Figure 6A:
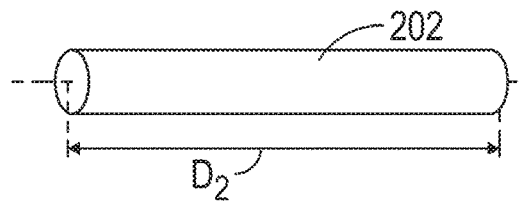
FIG. 6A is a side view of an SMA element in an unactuated configuration, according to another exemplary embodiment.
Figure 6B:
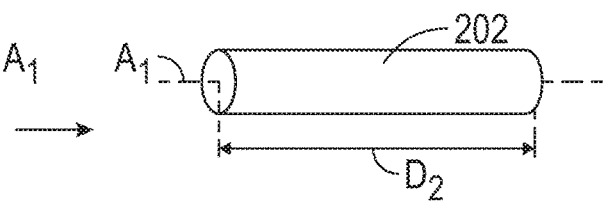
FIG. 6B is a side view of an SMA element in an actuated configuration, according to another exemplary embodiment.

Referring to FIGS. 6A and 6B, the SMA element 202 is configured to contract in response to reaching the operating temperature. Specifically, the SMA element 202 deforms such that the length of the SMA element 202 decreases parallel to a central axis Ai of the SMA element 202. FIG. 6A shows the SMA element 202 in the unactuated configuration, and FIG. 6B shows the SMA element 202 in the actuated configuration. The overall length $D_2$ of the SMA element 202 is greater in the unactuated configuration than in the actuated configuration. In some embodiments, the overall length $D_2$ is reduced by up to 3-5%. In some embodiments, the overall length $D_2$ is reduced by up to 8%. In some embodiments, material formulations such as Flexinol may be utilized to achieve a contracting deformation. Any of the SMA triggers described herein may include SMA elements that utilize bending deformation, contracting deformation, or some combination thereof.

The specific shape memory alloy material used in the trigger assembly 130 may be selected according to a desired operating temperature of the sprinkler 100. In response to the SMA trigger 130 meeting or exceeding the operating temperature, part or all of the SMA trigger 130 is configured to deform, changing from the unactuated shape, state, or configuration to the actuated shape, state, or configuration. In some embodiments, the desired operating temperature corresponds to a temperature indicative of fire. In some embodiments, the desired operating temperature corresponds to a temperature selected between the range 135° F. through 170° F., or within the temperature ranges as specified in Table 7.2.4.1 of NFPA-13-2019. In some embodiments, the SMA trigger 130 holds its basic shape (unactuated shape) prior to reaching the operating temperature.

In some embodiments, the SMA trigger 130 has one or more unactuated and/or actuated characteristics, corresponding to one or more physical dimensions or properties. For example, the SMA trigger 130 may be or include a material causing the SMA trigger 130 to deform within a time period, such as 10 seconds or less, upon reaching the actuation temperature. In some embodiments, the SMA trigger 130 additionally shrinks by at least 0.5 mm or more near the actuation temperature. In some embodiments, the SMA trigger 130 the actuated shape is curved and the non-actuated shape is straight or substantially straight. In some embodiments, the SMA trigger 130 is between 2-3 mm diameter and 16-20 mm long at the unactuated temperature. In some embodiments, the SMA trigger 130 is between 2-3 mm diameter and at least 60 mm long at the unactuated temperature. In some embodiments, the ends of the SMA trigger 130 may be blunted or have a smaller radius than a center portion.

Figure 7:
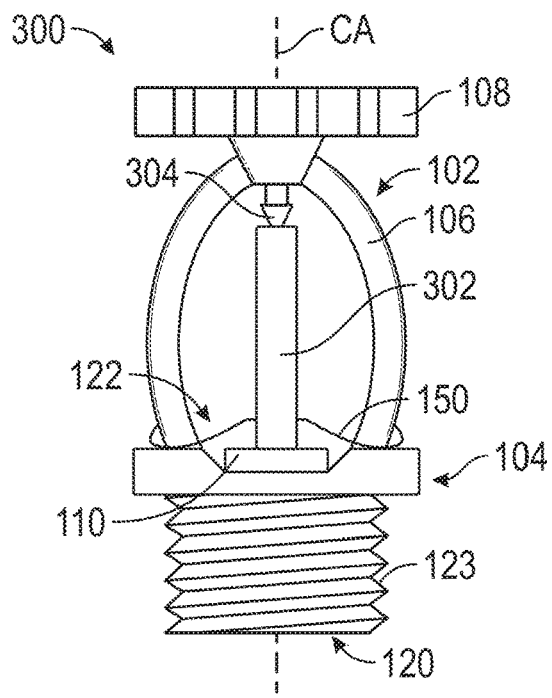
FIG. 7 is a front view of a sprinkler assembly including an SMA trigger, according to an exemplary embodiment.

Referring to FIG. 7, a sprinkler 300 is shown according to an exemplary embodiment. The sprinkler 300 may be substantially similar to the sprinkler 100 except as described herein. In this embodiment, the SMA trigger 130 is an SMA element 302. The SMA element 302 is a single, solid piece of SMA material. The SMA element 302 may have a circular, square, rectangular, triangular, hexagonal, or another shape of cross section. In the unactuated state, the SMA element 302 is substantially straight and aligned with the central axis CA. In the actuated state, the SMA element 202 may experience bending deformation, contracting deformation, or some combination thereof. This deformation reduces the overall length of the SMA element 302, reducing the compressive force on the SMA element 302. This reduction in force may sufficient to permit the seal assembly 124 to be released. In some embodiments, the sprinkler 300 includes an ejection spring 150 that facilitates disengagement of the SMA element 302.

Figure 8:
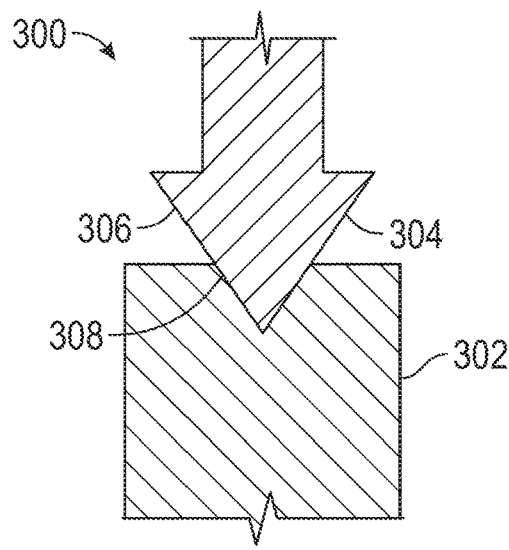
FIG. 8 is a front section view of the sprinkler assembly of FIG. 7.

Referring to FIGS. 7 and 8, in the sprinkler 300, the adjustment device 110 is an adjustment device 304. The adjustment device 304 has a protrusion 306 having a conical shape that is centered about the central axis CA. A portion of the adjustment device 304 may be threaded to permit adjustment of the position of the protrusion 306 along the central axis CA. The protrusion 306 is received within an aperture or recess 308 defined by a top end portion of the SMA element 302 (e.g., the top end portion as shown in FIG. 7). Due to the conical shape of the conical protrusion 306, the conical protrusion 306 centers the top end of the SMA element 302 about the adjustment device 304. In other embodiments, the protrusion 306 has a rounded (e.g., dome) shape. In some embodiments, the button 126 and the bottom end of the SMA element define corresponding flat surfaces (e.g., extending perpendicular to the central axis CA) that engage one another.

In other embodiments, the frame assembly 102 and/or the adjustment device 110 and the ends of the SMA element 302 define corresponding flat surfaces (e.g., extending perpendicular to the central axis CA) that engage one another. In other embodiments, a protrusion 306 extends from the seal assembly 124 (e.g., from the button 126) and is received by an aperture or recess 308 defined by the bottom end of the SMA element 302.

Figure 9:
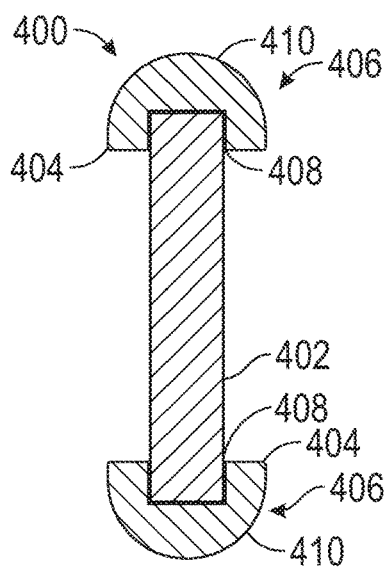
FIG. 9 is a front section view of an SMA trigger for a sprinkler assembly, according to an exemplary embodiment.
Figure 10:
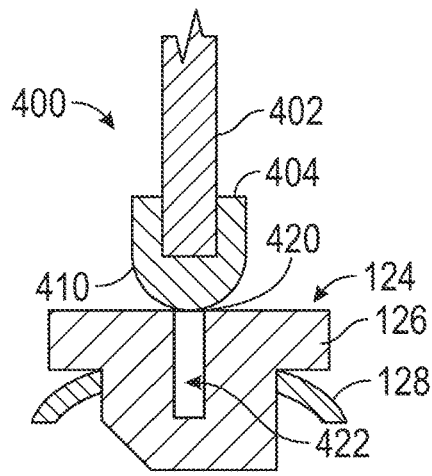
FIG. 10 is a front section view of the SMA trigger of FIG. 9 and a seal assembly of the sprinkler assembly of FIG. 1.
Figure 11:
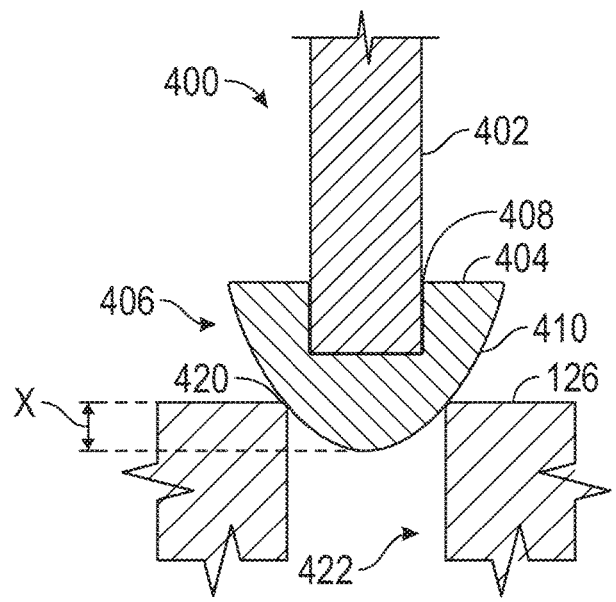
FIG. 11 is another front section view of the SMA trigger of FIG. 9 and the seal assembly of FIG. 10.

Referring to FIGS. 9-11, the SMA trigger 130 is an SMA trigger 400. The SMA trigger 400 includes an SMA element 402 coupled to a pair of interface members, shown as end caps 404. The SMA element 402 may be a single, solid piece of SMA material. Alternatively, the SMA element 402 may have one or more apertures extending therethrough. The SMA element 402 may have a circular, square, rectangular, triangular, hexagonal, or another shape of cross section. Each end cap 404 includes a collar portion 406 that defines an aperture or recess 408 configured to receive an end of the SMA element 402. The collar portion 406 at least partially surrounds the SMA element 402. Each end cap 404 also defines a rounded surface, shown as engagement surface 410. The engagement surface 410 may be domed, spherical, conical, or otherwise curved.

Referring to FIGS. 10 and 11, the button 126 defines an aperture 420 that leads to a recess 422, both of which are substantially centered about the central axis CA. The engagement surface 410 engages at least a portion of the perimeter of the aperture 420, holding the SMA trigger 400 in place. The end cap 404 extends at least partially into the recess 422. Specifically, the end cap 404 extends a distance X into the recess 422. The distance X may be varied by adjusting the size of the aperture 420 and/or the radius of curvature of the engagement surface 410. The rounded shape of the engagement surface 410 centers the end cap 404 about the central axis CA. Similarly, the frame assembly 102 and/or the adjustment device 110 may define an aperture 420 and a recess 422 that receive the other end cap 404.

In the unactuated state, the SMA element 402 is substantially straight and aligned with the central axis CA. In the actuated state, the SMA element 402 may experience bending deformation, contracting deformation, or some combination thereof. This deformation reduces the overall length of the SMA element 402, reducing the compressive force on the SMA element 402. This reduction in force may sufficient to permit the seal assembly 124 to be released, particularly if the SMA element 402 bends during the deformation (e.g., into a C shape). The rounded shapes of the engagement surfaces 410 may facilitate rotation of the end caps 404 relative to the frame assembly 102 and/or the seal assembly 124.

In some embodiments, the sprinkler 100 includes an ejection spring 150 that facilitates disengagement of the SMA trigger 400. An ejection spring 150 may be particularly useful in embodiments where the SMA element 402 experiences purely contracting deformation. During activation, the ejection spring 150 may apply a lateral biasing force to force the end cap 404 out of the recess 422. The magnitude of the lateral force required to remove the end cap 404 from the recess 422 may be dependent on the distance X and the compressive force on the SMA trigger 400.

Figure 12:
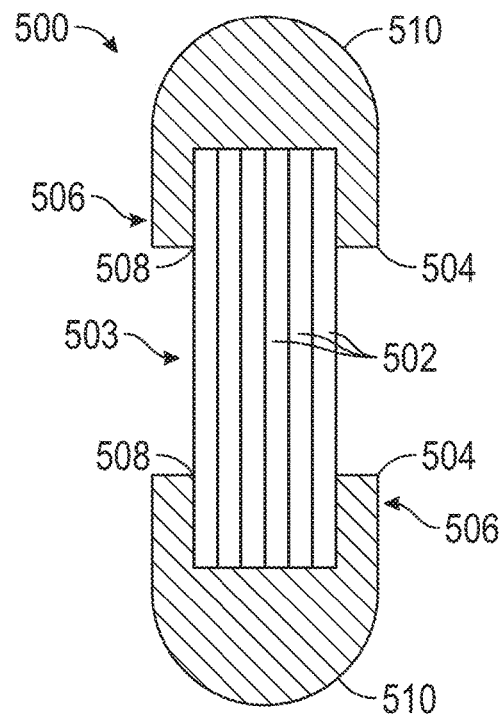
FIG. 12 is a partial side section view of an SMA trigger for a sprinkler assembly, according to an exemplary embodiment.
Figure 13:
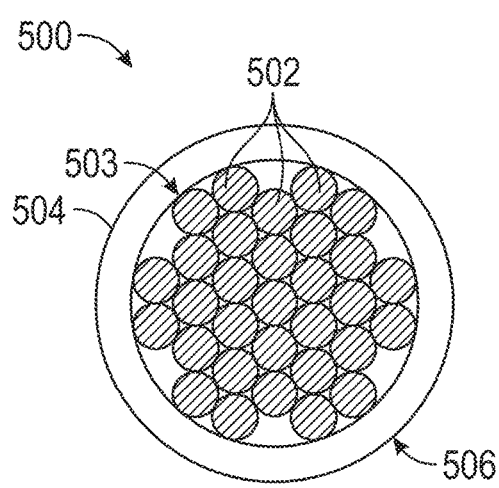
FIG. 13 is a top section view of the SMA trigger of FIG. 12.

Referring to FIGS. 12 and 13, an SMA trigger 500 is shown according to an exemplary embodiment. The SMA trigger 500 may be substantially similar to the SMA trigger 400 except as otherwise described herein. The SMA trigger 500 includes a series of SMA elements 502 that are arranged together to form a bundle 503. Although the SMA trigger 500 of FIG. 13 is shown with a given quantity of SMA elements 502, it should be understood that the bundle 503 may include more or fewer SMA elements 502. In the unactuated state, the SMA elements 502 all extend substantially parallel to the central axis CA and to one another. As shown, each SMA element 502 has a substantially circular cross section. In other embodiments, the SMA elements 502 have other cross-sectional shapes. As shown, each SMA element 502 is approximately the same length. In other embodiments, the lengths of the SMA elements 502 vary. In some embodiments, each SMA element 502 has a diameter of approximately 0.008-0.020 in, and the bundle 503 has an overall diameter of approximately 2-3 mm. The use of multiple smaller SMA elements 502 as opposed to one large SMA element may facilitate airflow between the individual SMA elements 502 and reduce the ratio of SMA element mass to SMA surface area. This may reduce the transition time required to activate the SMA trigger 500, permitting the sprinkler 100 to respond to a fire more quickly.

The SMA trigger 500 further includes a pair of end caps 504. Each end cap 504 includes a collar portion 506 that defines an aperture or recess 508 configured to receive an end of the bundle 503. In some embodiments, the recess 508 is tapered to facilitate a secure friction fit of the bundle 503 within the end cap 504. Additionally or alternatively, adhesive may be used to couple the bundle 503 to the end cap 504. The collar portion 506 at least partially surrounds the bundle 503. The collar portion 506 may prevent the SMA elements 502 from separating from one another and retain the SMA elements 502 in a desired orientation (e.g., parallel to one another) in the unactuated configuration. Each end cap 504 also defines a rounded surface, shown as engagement surface 510. The engagement surface 510 may engage the seal assembly 124 and/or the frame assembly 102 similarly to the engagement surface 410.

Figure 14:
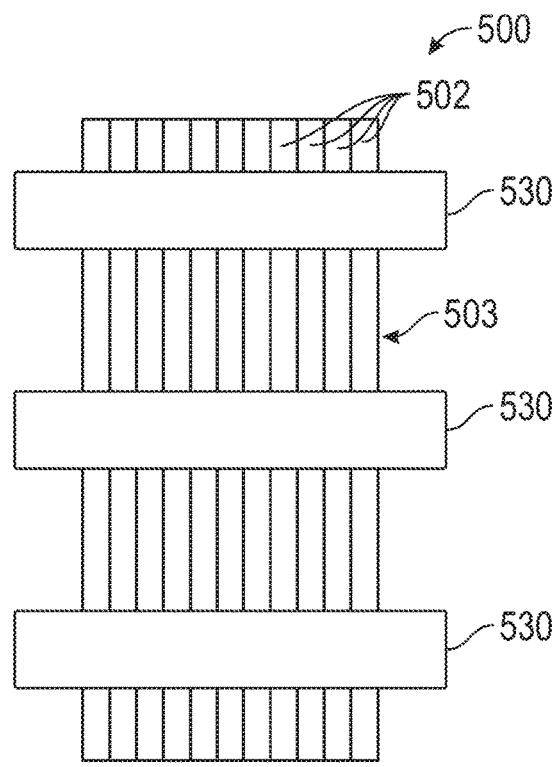
FIG. 14 is a front view of an SMA trigger for a sprinkler assembly, according to another exemplary embodiment.

Referring to FIG. 14, the SMA trigger 500 is shown according to an alternative embodiment. In this embodiment, the end caps 504 are omitted, and the shape of the bundle 503 is maintained in the unactuated configuration by a series of annular retaining members or collars, shown as rings 530. As shown in FIG. 14, the SMA trigger 500 includes three rings 530 evenly spaced along the length of the bundle 503. The rings 530 may be fixedly or slidably coupled to the bundle 503. In the unactuated configuration, the rings 530 hold the SMA elements 502 in a desired orientation. In some embodiments, in the actuated configuration, the SMA elements 502 experience bending or contracting deformation to facilitate activation of the sprinkler 100.

In some embodiments, the rings 530 are made from a material that is configured to deform (e.g., bend, melt, etc.) at the operation temperature, permitting the SMA elements 502 to move apart from one another. By way of example, the rings 530 may be made from a solder that melts at the operation temperature. By way of another example, the rings 530 may be made from an SMA material that deforms from an annular shape to a straight shape at the operation temperature. Once the SMA elements 502 move apart from one another, the bundle 503 may no longer hold the compressive force, and the seal assembly 124 may be free to exit the sprinkler 100. Accordingly, in some embodiments, the SMA elements 502 are replaced with similarly shaped and sized elements made from a non-SMA material.

Figure 15:
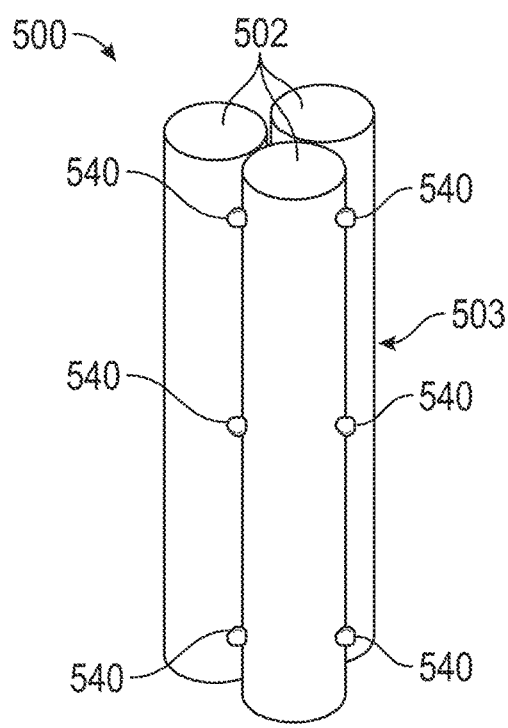
FIG. 15 is a perspective view of several SMA elements of an SMA trigger coupled to one another in an unactuated configuration, according to an exemplary embodiment.
Figure 16:
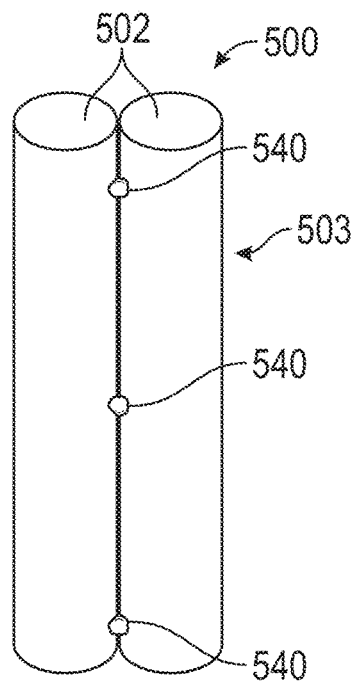
FIG. 16 is a perspective view of a pair of SMA elements of an SMA trigger coupled to one another in an unactuated configuration, according to an exemplary embodiment.
Figure 17:
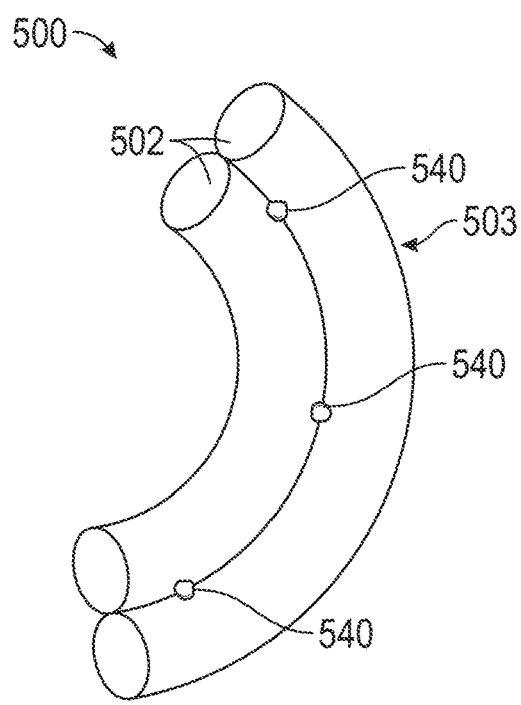
FIG. 17 is a perspective view of the pair of SMA elements of FIG. 16 in an actuated configuration.

In some embodiments, the rings 530 of FIG. 13 are used in combination with the end caps 504 of FIG. 12. The inclusion of the rings 530 may facilitate holding the SMA elements 502 in place. This strengthening of the bundle 503 may facilitate the use of smaller diameter SMA elements 502, resulting in a shorter transition time. Referring to FIGS. 15-17, additionally or alternatively, the SMA elements 502 may be directly coupled to one another. In some embodiments, the SMA elements 502 are welded (e.g., laser welded) to one another. Specifically, the SMA elements 502 are fixedly coupled to one another at points, shown as tack welds 540. The tack welds are spaced long the length of each SMA element 502. FIGS. 15 and 16 show the bundle 503 in the unactuated configuration. The use of tack welds 540 spaced apart from one another as opposed to a continuous weld along the length of each SMA element may facilitate bending of the SMA elements 502 when the SMA trigger 500 transitions to the actuated configuration (e.g., as shown in FIG. 17).

Figure 18A:
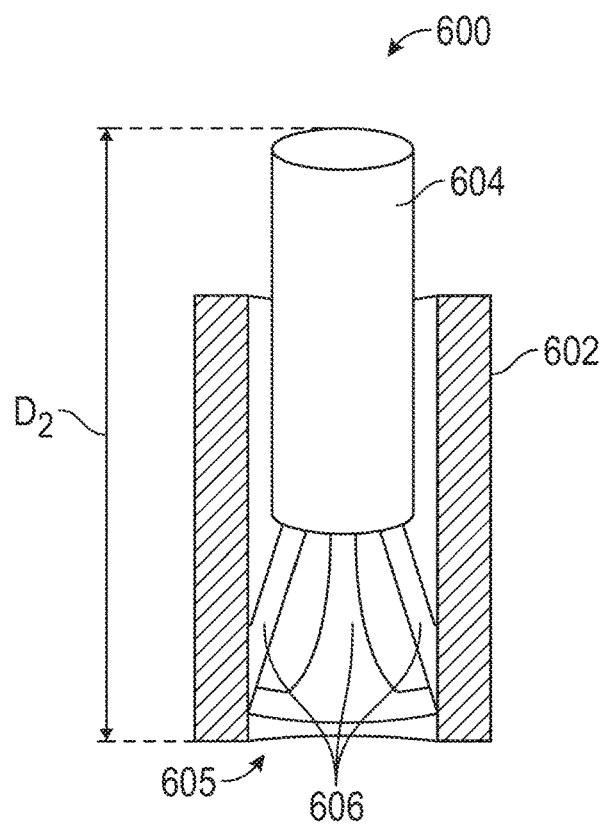
FIG. 18A is a partial front section view of an SMA trigger for a sprinkler assembly in an unactuated configuration, according to another exemplary embodiment.
Figure 18B:
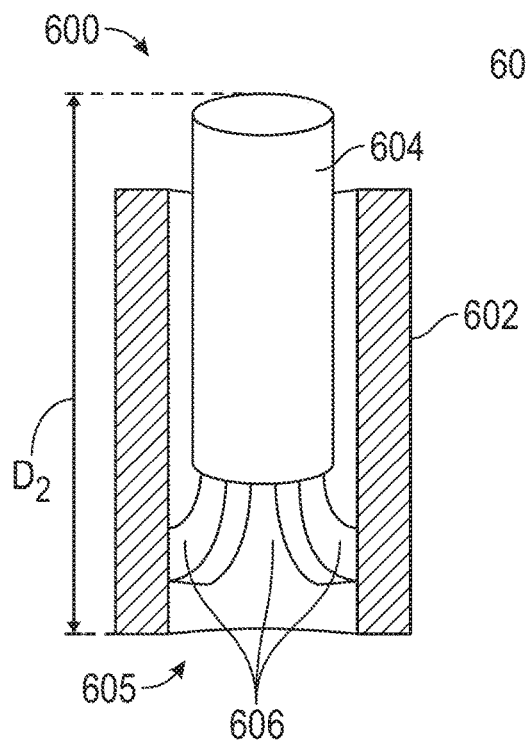
FIG. 18B is a partial front section view of the SMA trigger of FIG. 18A in an actuated configuration.

Referring to FIGS. 18A and 18B, the SMA trigger 130 is an SMA trigger 600.

The SMA trigger 600 includes a first member, shown as outer tube 602, and a second member, shown as push rod 604, that is received within a central passage 605 of the outer tube 602. A series of protrusions, shown as SMA levers 606, are coupled to the outer tube 602 and extend radially inward (e.g., toward the central axis CA) and upward from outer tube 602. The push rod 604 rests atop and is supported by the ends of the SMA levers 606. The top end of the push rod 604 may engage the frame assembly 102, and the bottom end of the outer tube 602 may engage the seal assembly 124 in the unactuated configuration of the sprinkler 100. Alternatively, the top end of the push rod 604 may engage the seal assembly 124, and the bottom end of the outer tube 602 may engage the frame assembly 102 in the unactuated configuration of the sprinkler 100.

Figure 19:
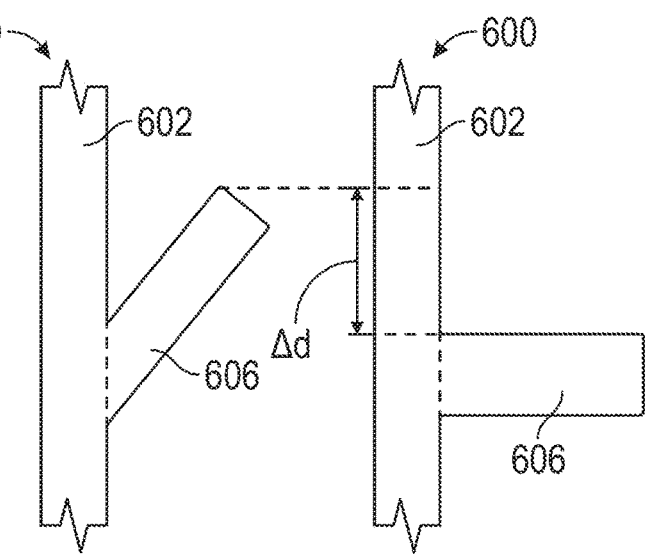
FIG. 19 is a side view of an SMA lever of the SMA trigger of FIG. 18A transitioning from the unactuated configuration to the actuated configuration.

Referring to FIGS. 18A-19, when transitioning from the unactuated configuration to the actuated configuration, the SMA levers 606 rotate downward, reducing the overall length $D_2$ of the SMA trigger 600. Specifically, as shown in FIG. 19, the ends of the SMA levers 606 move a distance Δd downward. Accordingly, the push rod 604 also moves the distance Δd downward, reducing the overall length $D_2$ by the distance Δd. This change in length permits the seal assembly 124 to move away from the body 104 and activate the sprinkler 100.

Figure 20A:
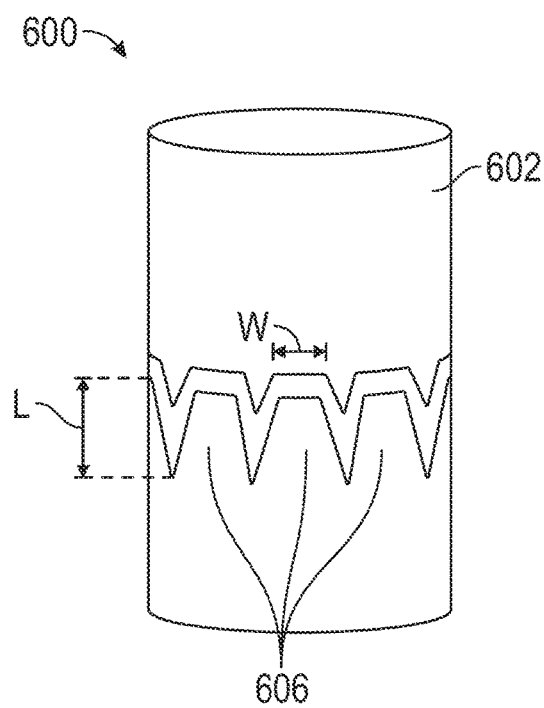
FIG. 20A is a perspective view of the SMA trigger of FIG. 19 during a first stage of a manufacturing process.
Figure 20B:
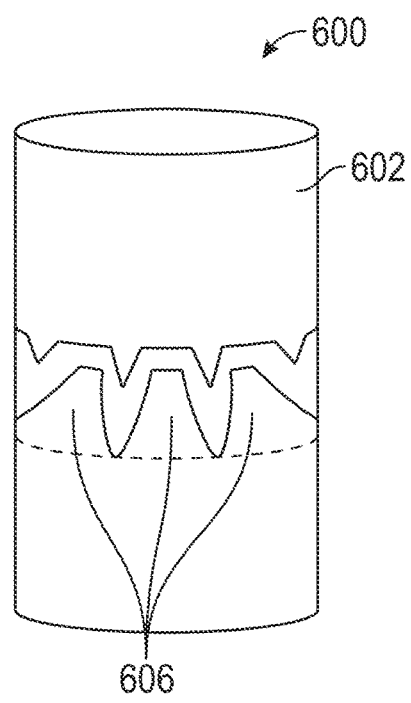
FIG. 20B is a perspective view of the SMA trigger of FIG. 19 during a second stage of the manufacturing process.

Referring to FIGS. 20A and 20B, in some embodiments, the SMA levers 606 may be formed from the outer tube 602. As shown in FIG. 20A, the SMA levers 606 may be cut (e.g., laser cut) from the outer tube 602. As shown in FIG. 20B, the SMA levers 606 may be bent inward. In other embodiments, the outer tube 602 and the SMA levers 606 are formed as separate pieces and coupled (e.g., welded, adhered, etc.) to one another. The SMA levers 606 each have a length L measured vertically and a width W measured horizontally. In some embodiments, the length L is much greater than the width W to facilitate buckling of the SMA levers 606 during activation of the sprinkler 100.

Figure 21:
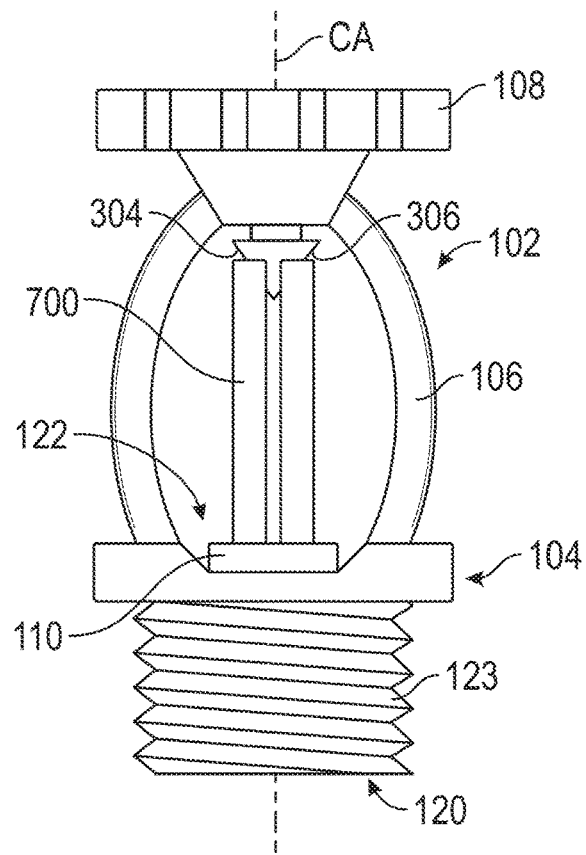
FIG. 21 is a front view of a sprinkler assembly including an SMA trigger in an unactuated configuration, according to an exemplary embodiment.
Figure 22A:
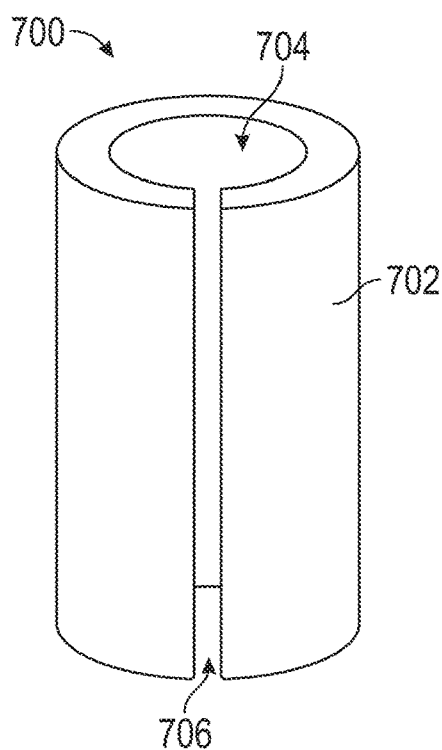
FIG. 22A is a perspective view of the SMA trigger of FIG. 21 in an unactuated configuration.

Referring to FIG. 21, the sprinkler 300 is shown according to an alternative embodiment. In this embodiment, SMA element 302 is omitted, and the SMA trigger 130 is an SMA element 700. As shown in FIG. 22A, in the unactuated configuration, the SMA element 700 includes a wall 702 that is substantially cylindrical. The wall 702 defines a passage 704 extending through the center of the SMA element 700. The wall 702 further defines a slot or groove 706 extending through the wall 702 along the entire length of the SMA element 700. The passage 704 receives the protrusion 306 of the adjustment device 304 to align the SMA element 700 with the central axis CA.

Figure 22B:
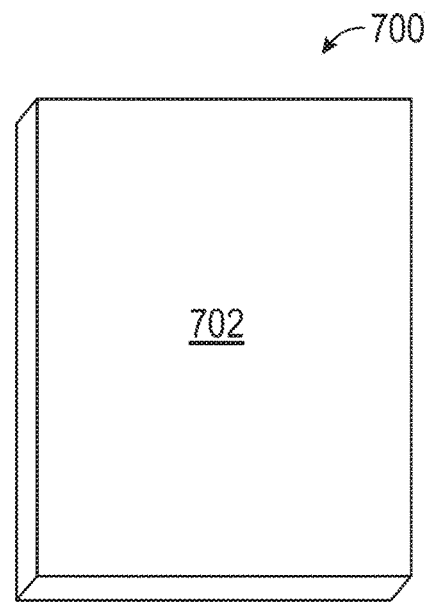
FIG. 22B is a perspective view of the SMA trigger of FIG. 21 in an actuated configuration.

In some embodiments, when transitioning to the actuated configuration, the SMA element 700 experiences bending or contraction deformation (e.g., similar to the SMA element 302). In some embodiments, when transitioning to the actuated configuration, the wall 702 of the SMA element 700 unrolls. In some embodiments, as shown in FIG. 22B, the wall 702 unrolls to the point where the wall 702 forms a flat sheet. As the SMA element 700 deforms, the compressive force on the SMA element 700 lessens, and the seal assembly 124 is permitted to move away from the body 104.

Figure 23:
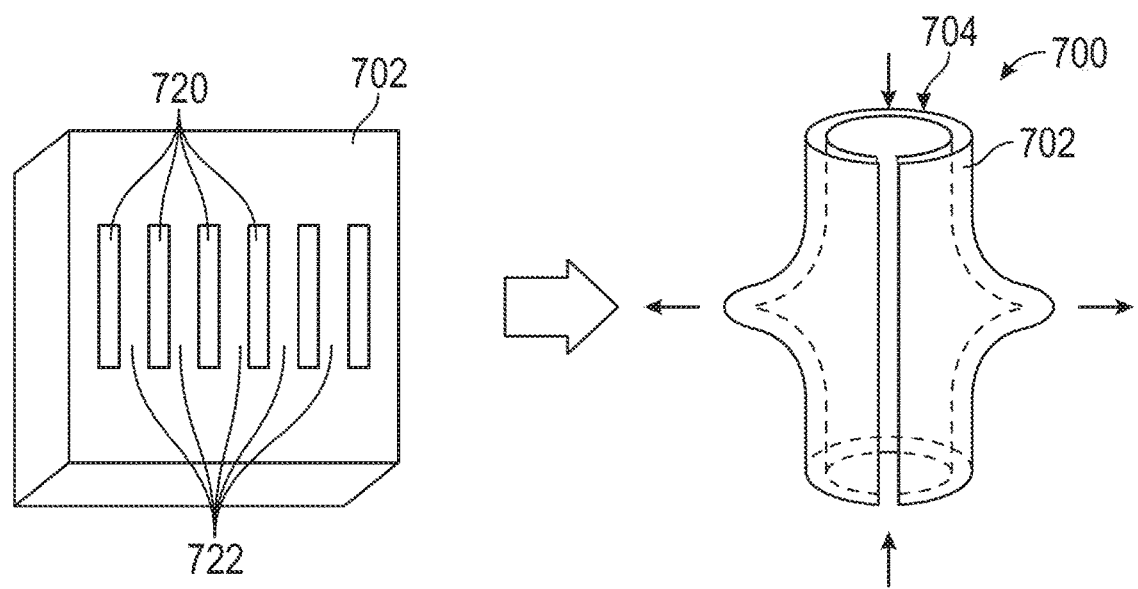
FIG. 23 is a perspective view of an SMA trigger for a sprinkler assembly, according to an exemplary embodiment.

Referring to FIG. 23, a modification to the SMA element 700 is shown, according to an exemplary embodiment. In this embodiment, a series of apertures, slots, slits, or cutouts, shown as vertical slits 720, are defined in the wall 702. The vertical slits 720 extend substantially vertically. Specifically, a height of each vertical slit 720 measured parallel to the central axis CA is much larger than a width of each vertical slit 720 measured perpendicular to the central axis CA. In the unactuated configuration, the SMA element 700 of FIG. 23 supports the load of the seal assembly 124 similarly to the SMA element 700 of FIG. 21. When transitioning to the actuated configuration, vertical sections 722 of the wall 702 positioned between the vertical slits 720 buckle, moving perpendicular to the central axis CA, and decreasing the overall length of the SMA element 700.

Figure 24:
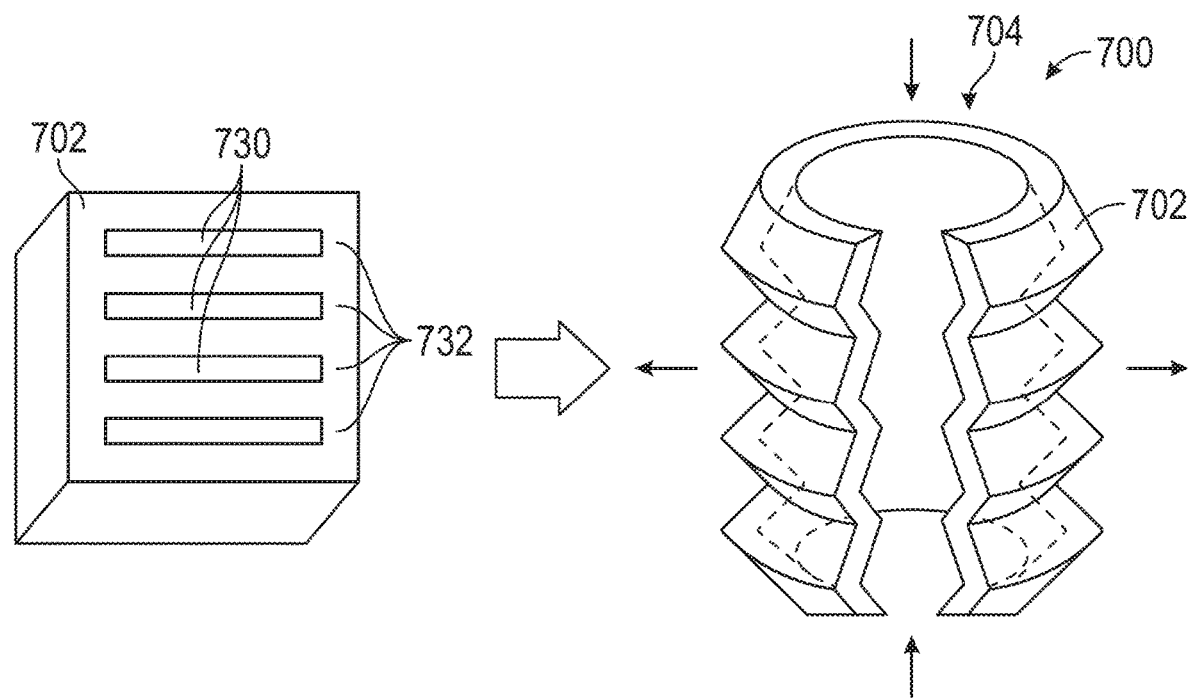
FIG. 24 is a perspective view of an SMA trigger for a sprinkler assembly, according to an exemplary embodiment.

Referring to FIG. 24, a modification to the SMA element 700 is shown, according to another exemplary embodiment. In this embodiment, a series of apertures, slots, slits, or cutouts, shown as horizontal slits 730, are defined in the wall 702. The horizontal slits 730 extend substantially horizontally. Specifically, a height of each horizontal slit 730 measured parallel to the central axis CA is much smaller than a width of each horizontal slit 730 measured perpendicular to the central axis CA. In the unactuated configuration, the SMA element 700 of FIG. 24 supports the load of the seal assembly 124 similarly to the SMA element 700 of FIG. 21. When transitioning to the actuated configuration, sections 732 of the wall 702 positioned adjacent the horizontal slits 730 buckle, moving perpendicular to the central axis CA, and decreasing the overall length of the SMA element 700.

Configuration of Exemplary Embodiments

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the sprinkler assembly as shown in the various exemplary embodiments is illustrative only. Additionally, any element disclosed in one embodiment may be incorporated or utilized with any other embodiment disclosed herein. For example, the end caps 504 may be incorporated in the SMA trigger 500. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A sprinkler for a fire suppression system, comprising:
   a body defining an inlet and an outlet fluidly coupled to the inlet, the inlet and outlet arranged along a longitudinal axis;
   a frame assembly including a frame member coupled to the body and extending away from the outlet, the frame assembly including a screw coupled with the frame member and disposed along the longitudinal axis, the screw having a first recess;
   a deflector coupled to the frame member and offset from the outlet;
   a seal assembly configured to sealingly engage the body to prevent flow through the outlet, the seal assembly having a second recess; and
   a shape memory alloy trigger configured to deform from an unactuated configuration to an actuated configuration in response to reaching an activation temperature, the shape memory alloy trigger having a first end and a second end opposite the first end, the first end and the second end are semispherical, the shape memory alloy trigger having a C-shape in the actuated configuration, wherein in the unactuated configuration, the shape memory alloy trigger is disposed along the longitudinal axis, the first end of the shape memory alloy trigger directly engages the first recess of the screw of the frame assembly and the second end of the shape memory alloy trigger directly engages the second recess of the seal assembly and holds the seal assembly in sealed engagement with the body; and wherein in the actuated configuration, the shape memory alloy trigger enables the seal assembly to disengage from the body.

2. The sprinkler of claim 1, further comprising a biasing element coupled to the shape memory alloy trigger and at least one of the frame assembly and the body, wherein the biasing element is configured to apply a biasing force onto the shape memory alloy trigger at least partially perpendicular to the longitudinal axis when the shape memory alloy trigger is in the unactuated configuration.

3. The sprinkler of claim 1 wherein the shape memory alloy trigger is configured to bend in response to reaching the activation temperature.

4. The sprinkler of claim 1, wherein the shape memory alloy trigger is structured to support a compressive force of 150 pounds, and has a first length in the unactuated configuration and a second length in the actuated configuration, and wherein the second length is less than the first length.

5. The sprinkler of claim 1, wherein the shape memory alloy trigger is a solid rod.

6. The sprinkler of claim 1, wherein the shape memory alloy trigger comprises a plurality of shape memory alloy elements, and wherein the plurality of shape memory alloy elements extend substantially parallel to the longitudinal axis in the unactuated configuration.

7. The sprinkler of claim 6, wherein the shape memory alloy trigger includes a collar extending at least partially around the plurality of shape memory alloy elements and coupling the shape memory alloy elements to one another.

8. The sprinkler of claim 7, wherein the collar is part of a cap that receives an end of each of the shape memory alloy elements, and wherein the cap engages at least one of the frame assembly and the seal assembly when the shape memory alloy trigger is in the unactuated configuration.

9. A method of manufacturing a sprinkler, comprising:
providing a body defining an inlet and an outlet in fluid communication with one another, the body having a central axis;
fixedly coupling a frame member to the body;
translatably coupling a screw to the frame member, the screw having a first recess;
positioning a seal assembly such that the seal assembly extends across the outlet, the seal assembly having a second recess;
inserting a shape memory alloy element between the screw and the seal assembly along the central axis to directly engage the first recess of the screw and the seal assembly, the shape memory alloy element having semispherical ends and structured to support 150 pounds; and
translating the screw toward the body until a compressive force is applied to the shape memory alloy element along the central axis by the seal assembly and the screw,
wherein the shape memory alloy element is to deform from an unactuated configuration to an actuated configuration in response to reaching an activation temperature, and wherein the compressive force decreases when the shape memory alloy element transitions from the unactuated configuration to the actuated configuration, the shape memory alloy element having a C-shape in the actuated configuration.

* * * * *